United States Patent
Sato

(10) Patent No.: US 9,339,908 B2
(45) Date of Patent: May 17, 2016

(54) MACHINE TOOL WITH COVER STRUCTURE ADAPTED FOR DISCHARGE OF CHIPS

(71) Applicant: FANUC Corporation, Yamanashi (JP)

(72) Inventor: Naoki Sato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 99 days.

(21) Appl. No.: 14/181,238

(22) Filed: Feb. 14, 2014

(65) Prior Publication Data

US 2014/0241823 A1    Aug. 28, 2014

(30) Foreign Application Priority Data

Feb. 26, 2013    (JP) .................................. 2013-036028

(51) Int. Cl.
  *B23Q 11/08* (2006.01)
  *B23Q 11/00* (2006.01)

(52) U.S. Cl.
  CPC ............ *B23Q 11/08* (2013.01); *B23Q 11/0053* (2013.01); *B23Q 11/0891* (2013.01); *B23Q 11/0042* (2013.01); *B23Q 11/0067* (2013.01); *Y02P 70/171* (2015.11); *Y10T 409/30392* (2015.01); *Y10T 409/304088* (2015.01)

(58) Field of Classification Search
  CPC ........... B23Q 11/0042; B23Q 11/0053; B23Q 11/0067; B23Q 11/08; B23Q 11/0891; Y10T 409/304088; Y10T 409/30392
  See application file for complete search history.

(56) References Cited

U.S. PATENT DOCUMENTS

| | | | | |
|---|---|---|---|---|
| 4,955,770 A * | 9/1990 | Kitamura | ....................... | 409/134 |
| 5,263,800 A | 11/1993 | Chen | | |
| 5,586,848 A * | 12/1996 | Suwijn | .......................... | 409/137 |
| 6,364,582 B1 | 4/2002 | Hoppe et al. | | |
| 6,641,341 B2 * | 11/2003 | Sato et al. | ..................... | 409/137 |
| 6,880,214 B2 * | 4/2005 | Studemann et al. | .......... | 29/27 C |
| 7,686,548 B2 * | 3/2010 | Tezuka et al. | ................ | 409/137 |
| 2006/0270540 A1 | 11/2006 | Takayama et al. | | |

(Continued)

FOREIGN PATENT DOCUMENTS

| | | |
|---|---|---|
| CN | 1275467 A | 12/2000 |
| CN | 101234473 A | 8/2008 |
| CN | 101663128 A | 3/2010 |

(Continued)

OTHER PUBLICATIONS

Decision to Grant a Patent mailed Jul. 29, 2014, corresponding to Japanese patent application No. 2013-036028.

(Continued)

*Primary Examiner* — Daniel Howell
*Assistant Examiner* — Yasir Diab
(74) *Attorney, Agent, or Firm* — Hauptman Ham, LLP

(57) ABSTRACT

A machine tool has a cover structure adapted for the discharge of chips. The cover is composed of a front cover, left and right side covers, and a bottom part. The bottom part is connected to a bed through the respective lower ends of the front cover and the side covers. Further, at least a part of the bottom part includes a slope gradually inclining from the side connected to the bed toward the outer periphery. Even if the chips produced during machining adhere to members inside the cover, they are washed away by a cutting fluid and discharged into a cutting fluid supply device through a channel located farthest from the central portion of the machine tool.

8 Claims, 6 Drawing Sheets

(56) References Cited

U.S. PATENT DOCUMENTS

| | | |
|---|---|---|
| 2008/0267723 A1 | 10/2008 | Tezuka et al. |
| 2010/0202848 A1 | 8/2010 | Tanizaki et al. |

FOREIGN PATENT DOCUMENTS

| | | | |
|---|---|---|---|
| JP | 61103753 A | | 5/1986 |
| JP | 1110036 U | | 7/1989 |
| JP | 6170685 A | | 6/1994 |
| JP | 1094940 A | | 4/1998 |
| JP | 2006-007391 A | | 1/2006 |
| JP | 2006007391 A | * | 1/2006 |
| JP | 2006102827 A | | 4/2006 |
| JP | 2007-061998 A | | 3/2007 |

OTHER PUBLICATIONS

Office Action mailed May 5, 2015, corresponding to Chinese patent application No. 201410064534.0.

* cited by examiner

MACHINE TOOL WITH COVER STRUCTURE ADAPTED FOR DISCHARGE OF CHIPS

RELATED APPLICATIONS

The present application claims the benefit of Japanese Application Number 2013-036028, filed Feb. 26, 2013, the disclosure of which is hereby incorporated by reference herein in its entirety.

BACKGROUND OF THE INVENTION

1. Field of the Invention

The present invention relates to a machine tool, and more particularly, to a machine tool with a cover structure adapted for the discharge of chips.

2. Description of the Related Art

In a machine tool, chips produced during machining adhere to or are deposited inside a metal plate cover that covers a machining area or on the surface of another cover component. In order to continue normal use of the machine tool, the chips must be removed. In doing this, the chips are washed away by a cutting fluid and collected in a cutting fluid supply device.

As described in Japanese Patent Applications Laid-Open Nos. 2007-61998 and 2006-7391, therefore, a metal plate cover that receives chips is generally shaped so that a portion thereof that contacts a casting component located in the center of a machine is formed at the lowest level and the cover is gradually elevated from the lowest portion toward its outer peripheral portion.

In the technique disclosed in Japanese Patent Application Laid-Open No. 2007-61998 described above, the adopted shape of the metal plate cover induces the chips and cutting fluid to collect in an area near a drive unit (not shown) of the machine. If the chips are deposited on the bottom surface of the cover, they adhere to a linear-motion guide or feed screw of a drive system, possibly causing trouble. Since the cutting fluid probably splashes, moreover, it inevitably carries away a lubricant applied to the drive system and may cause a malfunction of the machine. This problem can be partially solved by the technique described in Japanese Patent Application Laid-Open No. 2006-7391, but not fully.

SUMMARY OF THE INVENTION

Accordingly, in view of the problems of the prior art described above, the object of the present invention is to provide a machine tool with a cover structure adapted for the discharge of chips, capable of preventing such failure that the chips get into components of a drive system or a lubricant is washed away by a cutting fluid.

A machine tool according to the present invention comprises a table on which a workpiece is placed and a column comprising a spindle to which a tool for machining the workpiece is attached, the table and the spindle being disposed on a bed, and a cover comprising a front cover provided on the side opposite the column with the table therebetween, left and right side covers provided on the left and right sides, respectively, of the front cover, and a bottom part connected to the bed through the respective lower ends of the front cover and the side covers. At least a part of the bottom part comprises a slope that inclines outward from the side of the bed.

That part of the bottom part of the cover which is connected to the front cover may be configured to comprise a slope gradually inclining outward from the side connected to the bed.

Those parts of the bottom part of the cover which are connected individually to the left and right side covers may be configured to gradually incline rearward or forward relative to the machine tool.

That part of the bottom part of the cover which is connected to one of the left and right side covers may be configured to gradually incline rearward relative to the machine tool, and that part connected to the other side cover may be configured to gradually incline forward relative to the machine tool.

That part of the bottom part of the cover which is connected to the front cover may be configured to gradually incline from one of the left and right side covers toward the other.

That part of the bottom part of the cover which is connected to the front cover may be configured to comprise slopes gradually inclining from an elevated, transversely central portion thereof toward the left and right side covers.

Curved surfaces may be provided individually at a portion where the front cover and the left side cover intersect each other and a portion where the front cover and the right side cover intersect each other.

Those parts of the bottom part of the cover which are connected to the front cover and the left and right side covers may each be provided with a cutting fluid supply passage through which a cutting fluid is supplied.

According to the present invention, there can be provided a machine tool with a cover structure adapted for the discharge of chips, capable of preventing such failure that the chips get into components of a drive system or a lubricant is washed away by a cutting fluid.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
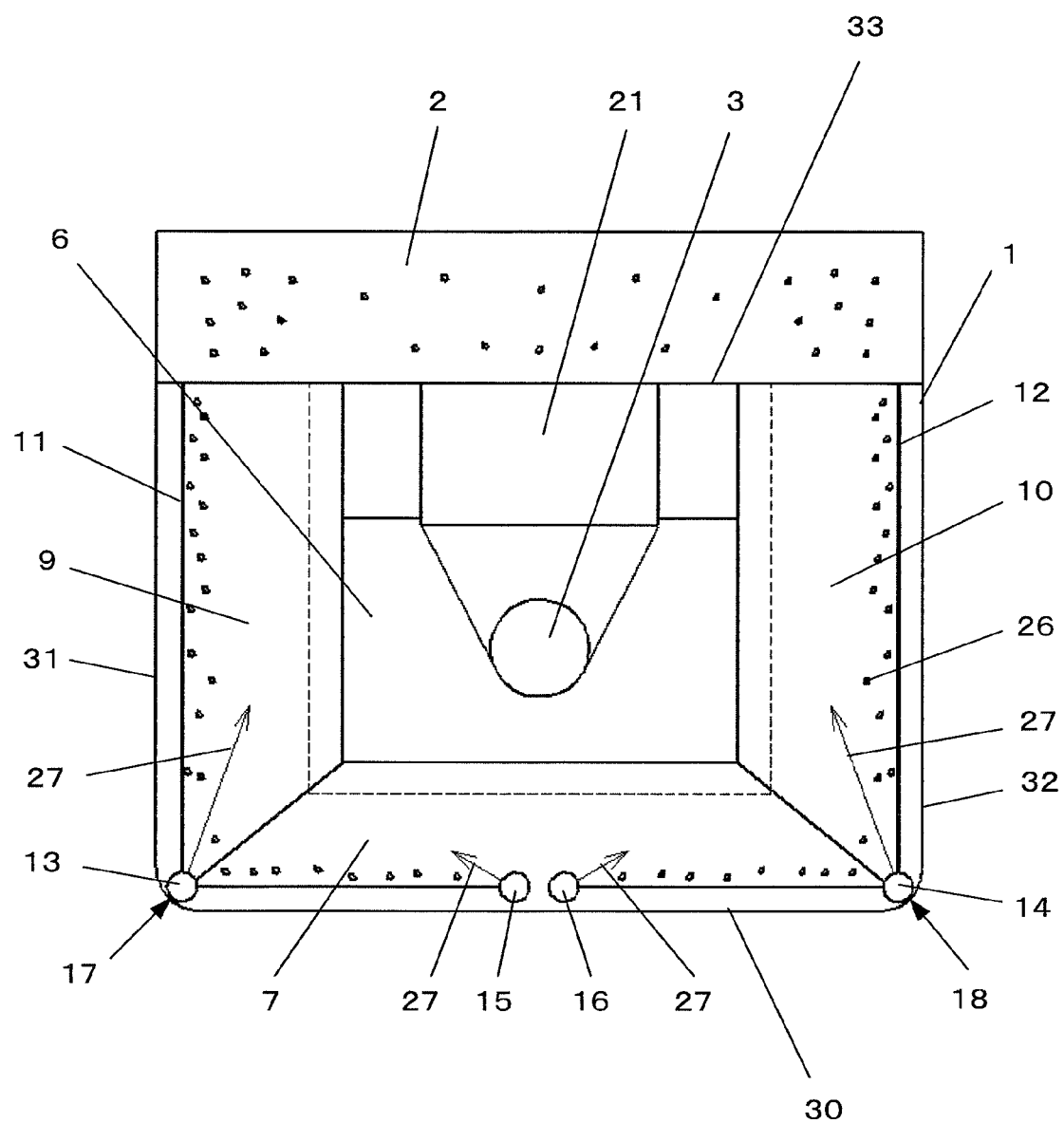
FIG. 1 is a schematic top view of Embodiment 1 of a machine tool according to the present invention.

First, Embodiment 1 of a machine tool according to the present invention will be described with reference to FIGS. 1 and 2.

A saddle 23 is supported on a bed 22 of a machine tool 40 by a saddle movement mechanism 25, and a table 6 is supported on the saddle 23 by a table movement mechanism 24. Further, a column 21 is set up on the bed 22, and a spindle 3 to which a tool 4 is attached is secured to the top of the column 21. As the spindle 3 and the table 6 are relatively moved in a machining space, the machine tool 40 machines a workpiece 5 placed on the table 6.

A cover 1 isolates the saddle 23, table 6, column 21, spindle 3, and tool 4 from the outside and defines the machining space. The cover 1 comprises a front cover 30, side covers 31 and 32, rear cover 33, ceiling cover (not shown), and bottom part. The front cover 30 is disposed on the side opposite to the column 21 with the table 6 therebetween. The side covers 31 and 32 are provided on the left and right sides, respectively, of the front cover 30. The bottom part of the cover 1 comprises a cover front-bottom surface 7, a cover left-bottom surface 9, and a cover right-bottom surface 10. The cover front-bottom surface 7 connects the lower end of the front cover 30 and the front end surface of the bed 22. The cover left-bottom surface 9 connects the lower end of the left side cover 31 and the left end surface of the bed 22. The cover right-bottom surface 10 connects the lower end of the right side cover 32 and the right end surface of the bed 22. The cover front-bottom surface 7, cover left-bottom surface 9, and cover right-bottom surface 10 that constitute the bottom part may be members integral with or independent of the front cover 30, left side cover 31, and right side cover 32, respectively.

Left and right cutting fluid supply passages 11 and 12 are disposed in the machining space to introduce a cutting fluid into the machining space that is isolated from the outside by the cover 1. The cutting fluid is supplied from a cutting fluid supply device 2 to the left and right cutting fluid supply passages 11 and 12 through a passage (not shown). First and second cutting fluid supply nozzles 13 and 15 are provided at predetermined places of the left cutting fluid supply passage 11, and third and fourth cutting fluid supply nozzles 14 and 16 at predetermined places of the right cutting fluid supply passage 12. The cutting fluid is discharged in predetermined directions (see flows 27 of the cutting fluid) in the machining space from the cutting fluid supply nozzles 13 to 16.

The bottom part of the cover 1 is inclined so that a portion thereof connected to the bed 22 is most elevated and that it gradually inclines from that portion toward its peripheral portion (or toward the respective lower ends of the front cover 30 and the left and right side covers 31 and 32). Specifically, the cover front-bottom surface 7 is a slope that gradually inclines from the side connected to the bed 22 toward the lower end of the front cover 30. Further, the cover left-bottom surface 9 is a slope that gradually inclines from the side connected to the bed 22 toward the lower end of the left side cover 31, while the cover right-bottom surface 10 is a slope that gradually inclines from the side connected to the bed 22 toward the lower end of the right side cover 32.

Furthermore, the left and cover right-bottom surfaces 9 and 10 may be gradually inclined from the side connected to the bed 22 toward the lower ends of the left and right side covers 31 and 32, and at the same time, gradually inclined from the front side of the cover 1 toward the rear side (or toward the rear cover 33).

Further, a corner portion where the respective lower end portions of the left side cover 31 and the front cover 30 intersect each other may be machined into a round shape with a predetermined curvature, as designated by reference numeral 17 in FIG. 1. Also, a corner portion where the respective lower end portions of the right side cover 32 and the front cover 30 intersect each other may be machined into a round shape with a predetermined curvature, as designated by reference numeral 18 in FIG. 1. In this way, the flow of chips 26 can be improved to reduce stagnation.

With this configuration, if the chips 26 produced by machining are deposited on the cover front-bottom surface 7 of the bottom part of the cover 1, they are caused to flow toward the outer peripheral portion of the cover front-bottom surface 7 by the cutting fluid supplied from the second and fourth cutting fluid supply nozzles 15 and 16 and collected along the lower end of the front cover 30. Then, the chips 26, along with the cutting fluid, are discharged to the cover left-bottom surface 9 or the cover right-bottom surface 10.

On the other hand, the chips 26 deposited on the cover left-bottom surfaces 9 and the cover right-bottom surfaces 10 of the bottom part of the cover 1, along with the chips 26 and the cutting fluid discharged from the cover front-bottom surface 7, are urged to flow toward and discharged into the cutting fluid supply device 2 at the back by the cutting fluid (designated by reference numeral 27 in FIG. 1) supplied from the first and third cutting fluid supply nozzles 13 and 14.

Figure 2:
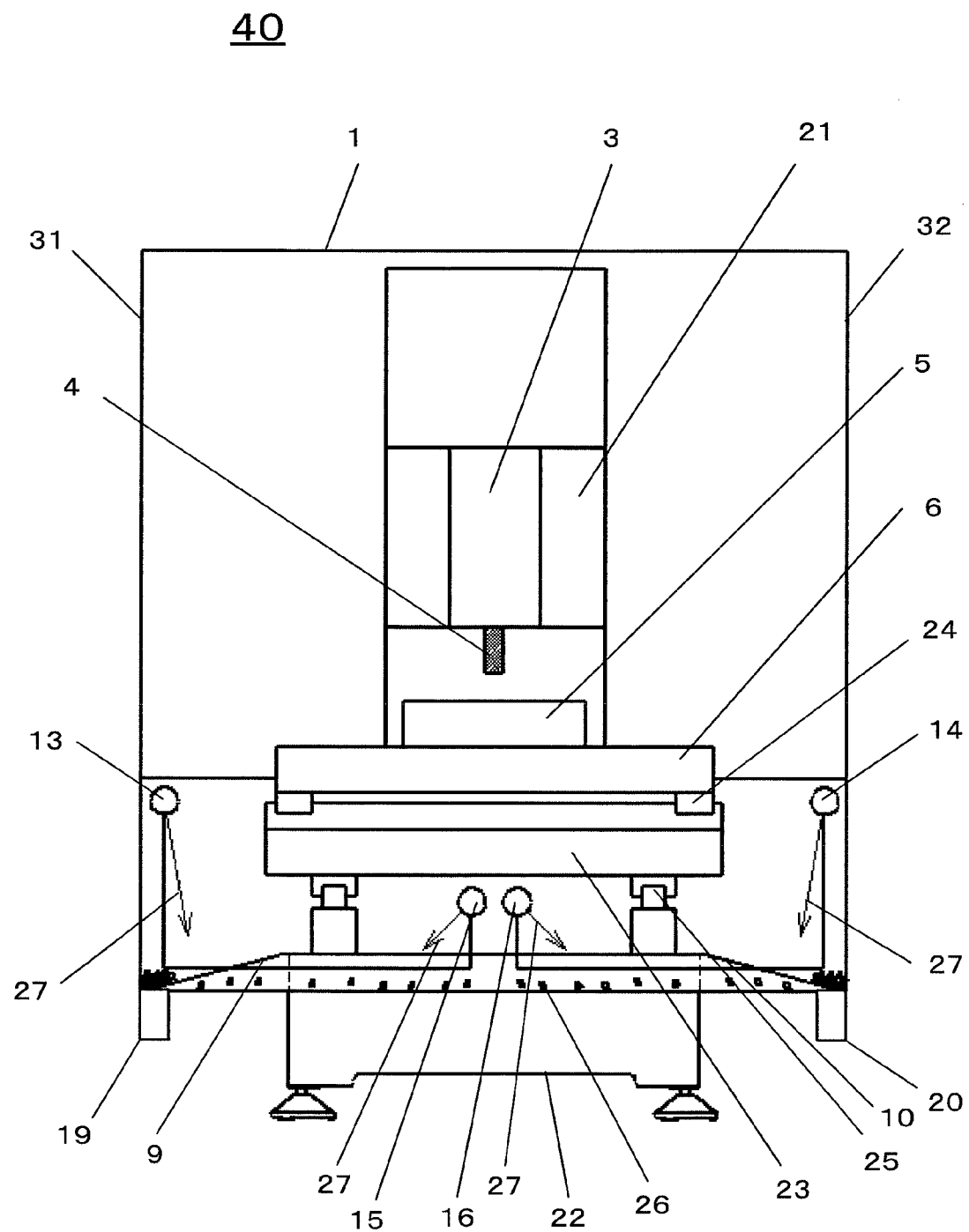
FIG. 2 is a schematic front view of the machine tool shown in FIG. 1.

In the case where the chips 26 are discharged to the front surface or the left and right side surfaces of the machine tool 40, they are discharged into the cutting fluid supply device 2 through left and right discharge passages 19 and 20 at the respective lower ends of the left and right side covers 31 and 32, as shown in FIG. 2.

According to this embodiment, the chips 26 deposited on the bottom part of the cover 1 are urged to collect at the outer peripheral portion, the most sunken portion, of the bottom part of the cover 1 by the flows of the cutting fluid from the cutting fluid supply nozzles. Thus, the chips 26 deposited on the bottom part (comprising the cover front-bottom surface 7, the cover left-bottom surfaces 9, and the cover right-bottom surfaces 10) are discharged into the cutting fluid supply device 2 while moving along the outer peripheral portion of the cover 1, which is located farthest from the central portion of the machining space inside the cover 1 where a drive system (comprising the saddle movement mechanism 25, saddle 23, table movement mechanism 24, and table) is disposed. Consequently, it is possible to prevent failure of the machine tool that may be caused if the chips get into the components of the drive system or a lubricant is washed away by the cutting fluid.

Figure 3:
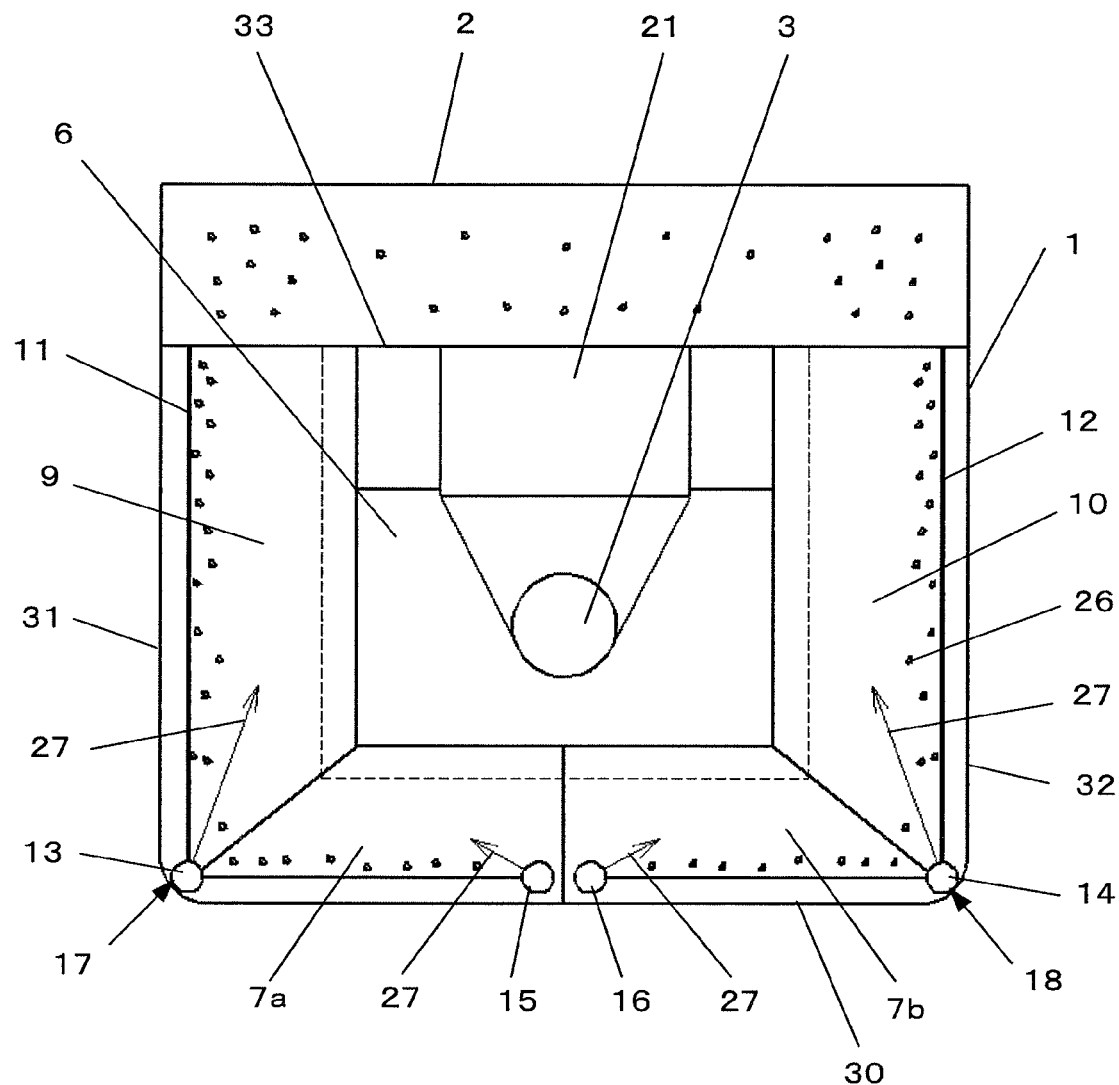
FIG. 3 is a schematic top view of Embodiment 2 of the machine tool according to the present invention.
Figure 4:
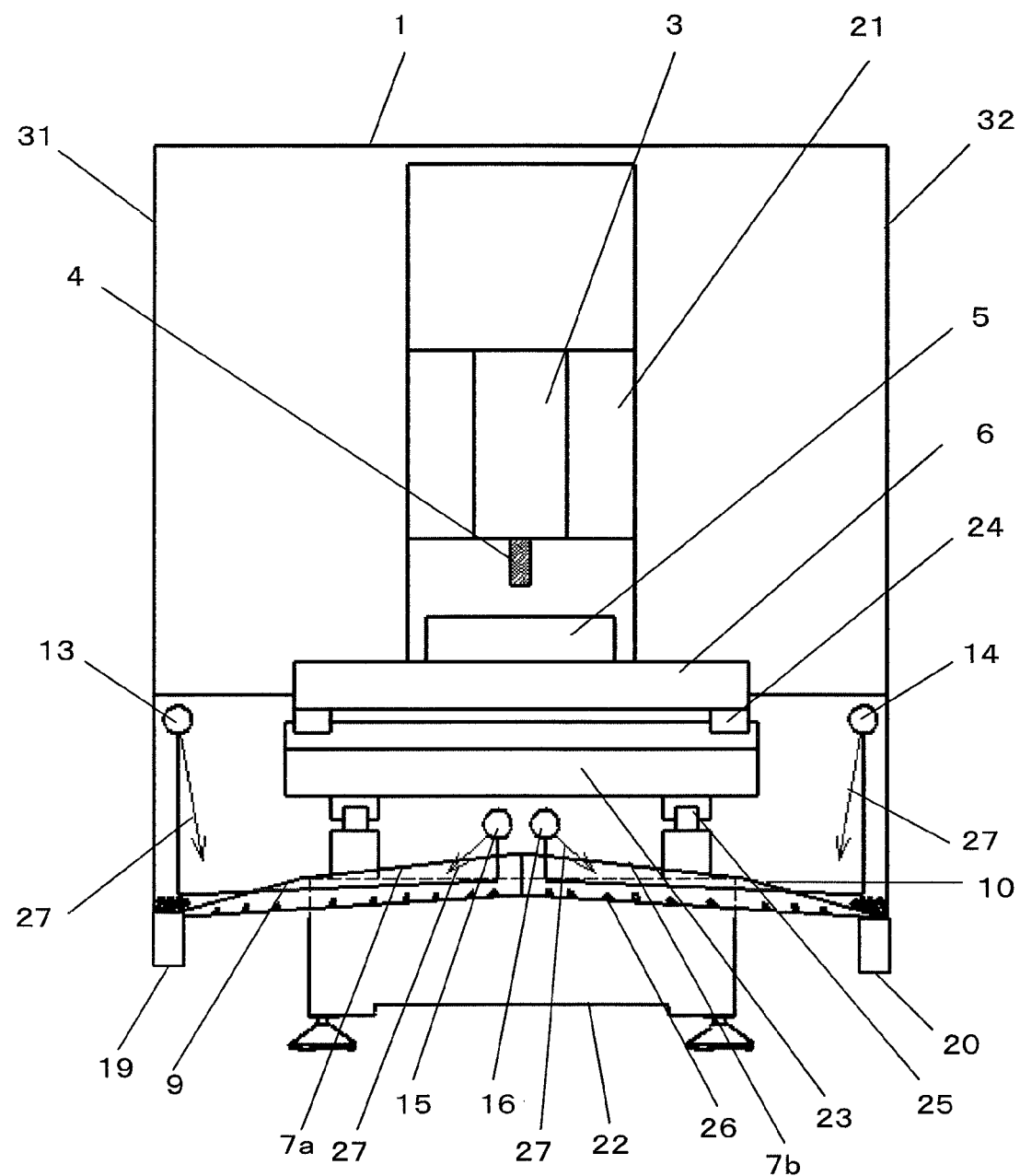
FIG. 4 is a schematic front view of the machine tool shown in FIG. 3.

Embodiment 2 of the machine tool according to the present invention will now be described with reference to FIGS. 3 and 4.

In this embodiment, the cover front-bottom surface 7 of the bottom part of the cover 1 of Embodiment 1 is divided into a cover front-left-bottom surface 7a and a cover front-right-bottom surface 7b. The cover front-left-bottom surface 7a is gradually inclined from the side connected to a bed 22 toward the lower end of a front cover 30 and also gradually inclined toward a left side cover 31. Further, the cover front-right-bottom surface 7b is gradually inclined from the side connected to the bed 22 toward the lower end of the front cover 30 and also gradually inclined toward a right side cover 32. Thus, in this embodiment, the cover front-bottom surface 7 of the bottom part of the cover 1 is in the shape of an inverted V inclining left and right. Since other configurations are the same as those of Embodiment 1, a further description thereof is omitted.

In this embodiment, if chips 26 are deposited on the cover front-left-bottom surface 7a, they are caused to flow on the cover front-left-bottom surface 7a by a cutting fluid supplied from a second cutting fluid supply nozzle 15 and discharged along with the cutting fluid to the cover left-bottom surface 9. If the chips 26 are deposited on the cover front-right-bottom surface 7b, moreover, they are caused to flow on the cover front-right-bottom surface 7b by the cutting fluid supplied from a fourth cutting fluid supply nozzle 16 and discharged along with the cutting fluid to the cover right-bottom surface 10. On the other hand, the chips 26 deposited on the cover left-bottom surface 9 and the cover right-bottom surface 10, along with the chips 26 and the cutting fluid discharged from the cover front-left-bottom surface 7a and the cover front-right-bottom surface 7b, are urged to flow toward and discharged into a cutting fluid supply device 2 at the back by the cutting fluid (designated by reference numeral 27 in FIG. 1) supplied from first and third cutting fluid supply nozzles 13 and 14.

Figure 5:
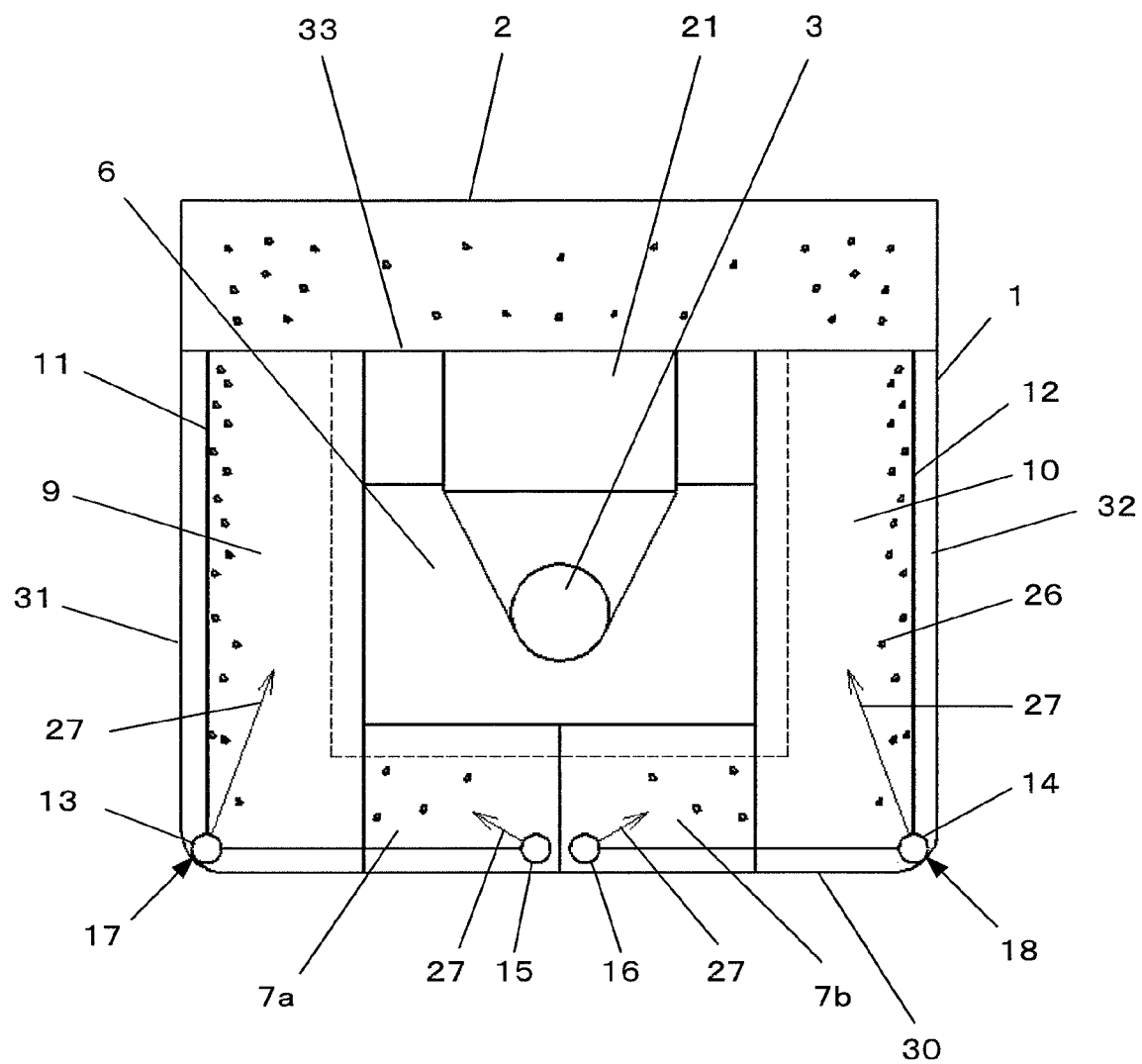
FIG. 5 is a schematic top view of Embodiment 3 of the machine tool according to the present invention.
Figure 6:
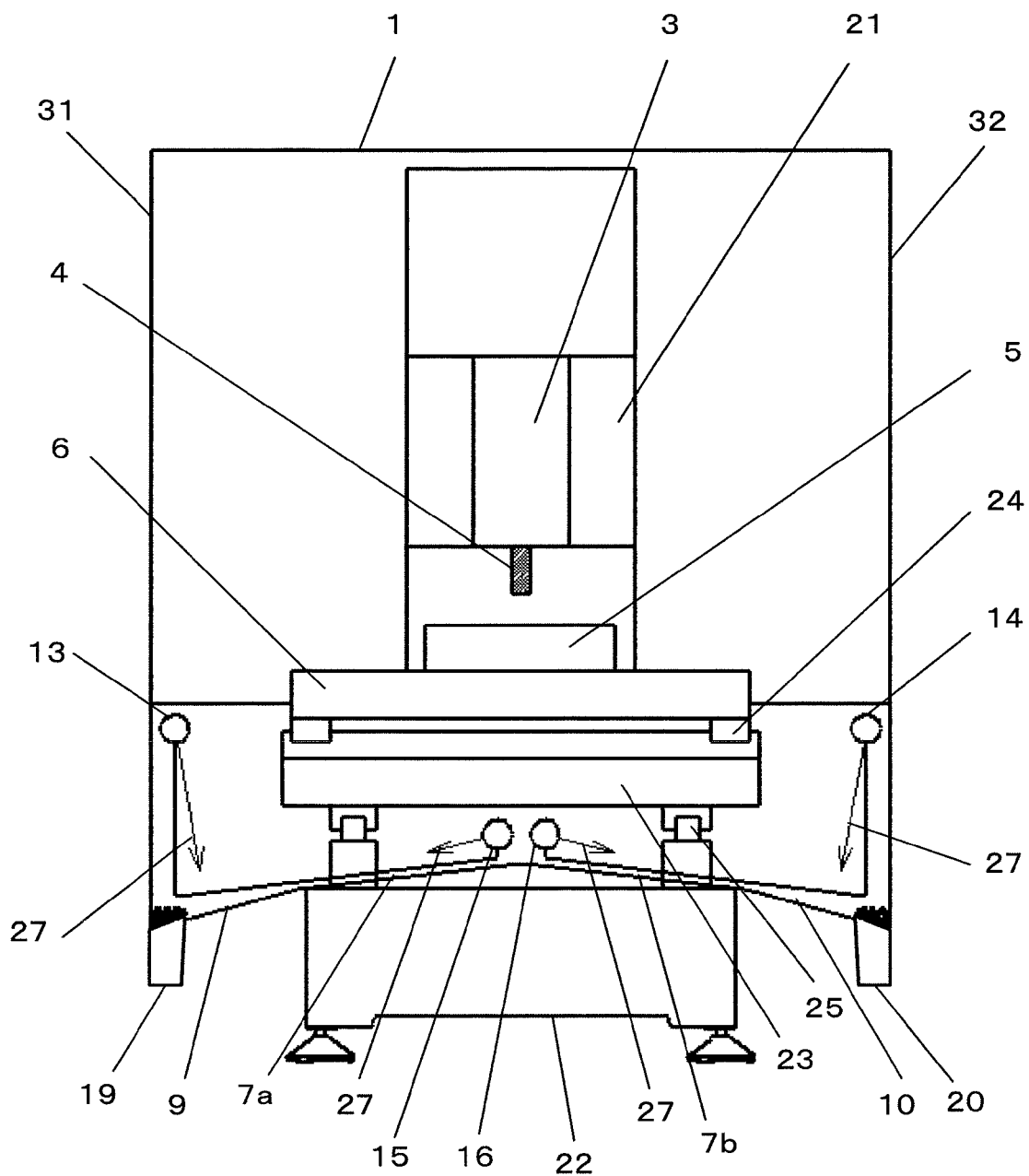
FIG. 6 is a schematic front view of the machine tool shown in FIG. 5.

Embodiment 3 of the machine tool according to the present invention will now be described with reference to FIGS. 5 and 6.

This embodiment resembles Embodiment 2 described above in that a cover front-bottom surface 7 of a bottom part of a cover 1 is divided into the cover front-left-bottom surface 7a and the cover front-right-bottom surface 7b so that it is in the shape of an inverted V inclining left and right. However, this embodiment differs from Embodiment 2 in that the cover front-left-bottom surface 7a and the cover front-right-bottom surface 7b are not inclined from the side connected to a bed 22 toward the lower end of a front cover 30. Since other configurations are the same as those of Embodiment 1, a further description thereof is omitted.

In the machine tool according to the present invention, as described above, the cover comprises the front cover, left and right side covers, and bottom part, and the bottom part is connected to the bed of the machine tool through the respective lower ends of the front and side covers. According to the present invention, moreover, the bottom part of the cover comprises slopes that at least partially inclines from the side connected to the bed toward the outer periphery. The following is a description of some examples of the form of the bottom part of the cover 1 that characterizes the invention.

EXAMPLE 1

Of the bottom part of the cover 1, the cover left-bottom surfaces 9 connected to the left side cover 31 and the cover right-bottom surfaces 10 connected to the right side cover 32 are slopes that incline outward (or toward the left and right side covers 31 and 32) from the side connected to the bed 22.

EXAMPLE 2

Of the bottom part of the cover 1, the cover front-bottom surface 7 connected to the front cover 30 is a slope that inclines outward (or toward the front cover 30) from the side connected to the bed 22.

EXAMPLE 3

Of the bottom part of the cover 1, the cover left-bottom surfaces 9 connected to the left side cover 31 and the cover right-bottom surfaces 10 connected to the right side cover 32 are slopes that individually incline rearward or forward relative to the machine tool 40, in addition to Example 1 or 2.

EXAMPLE 4

Of the bottom part of the cover 1, the cover left-bottom surface 9 connected to the left side cover 31 is a slope that inclines rearward relative to the machine tool 40, and the cover right-bottom surface 10 connected to the right side cover 32 is a slope that inclines forward relative to the machine tool 40, in addition to Example 1 or 2. Alternatively, the cover left-bottom surface 9 connected to the left side cover 31 is a slope that inclines forward relative to the machine tool 40, and the cover right-bottom surface 10 connected to the right side cover 32 is a slope that inclines rearward relative to the machine tool 40, in addition to Example 1 or 2.

EXAMPLE 5

Of the bottom part of the cover 1, the cover front-bottom surface 7 connected to the front cover 30 is a slope that inclines from the side of the left side cover 31 toward the right side cover 32, or vice versa, in addition to Example 2 or 4.

EXAMPLE 6

Of the bottom part of the cover 1, the cover front-bottom surface 7 connected to the front cover 30 comprises slopes that incline from its central portion to the left and right (or toward the left and right side covers 31 and 32), in addition to any one of Examples 1 to 3.

EXAMPLE 7

A portion (or junction) where the front cover 30 and the left side cover 31 intersect each other and a portion (or junction) where the front cover 30 and the right side cover 32 intersect each other are curved surfaces with a predetermined curvature, in addition to any one of Examples 1 to 6.

EXAMPLE 8

The bottom part of each of the front cover 30 and the left and right side covers 31 and 32 is provided with left and right cutting fluid supply passages 11 and 12, in addition to any one of Examples 1 to 6.

The invention claimed is:

1. A machine tool, comprising:
    a table on which a workpiece is to be placed;
    a column comprising a spindle to which a tool for machining the workpiece is attached;
    a bed on which the table and the spindle are disposed; and
    covers which include
        a front cover provided on a side opposite the column with the table therebetween,
        side covers provided on left and right sides, respectively, of the front cover,
        a front bottom part connecting a lower end of the front cover to the bed, and
        side bottom parts connecting respective lower ends of the side covers to the bed,
    wherein each of the side bottom parts connecting the bed to the respective lower ends of the side covers comprises a slope that is gradually inclined outward from the bed and downward to the respective lower end of the respective side cover.

2. The machine tool according to claim 1, wherein the front bottom part connecting the bed to the lower end of the front cover comprises a slope that is gradually inclined outward from the bed.

3. The machine tool according to claim 1, wherein both of the side bottom parts connecting to the bed to the respective lower ends of the side covers are gradually inclined rearward or forward relative to the machine tool.

4. The machine tool according to claim 1, wherein
    one of the side bottom parts connecting the bed to the respective lower ends of the side covers is gradually inclined rearward relative to the machine tool, and
    the other of the side bottom parts is gradually inclined forward relative to the machine tool.

5. The machine tool according to claim 1, wherein the front bottom part connecting the bed to the lower end of the front cover is gradually inclined from one of the side covers toward the other.

6. The machine tool according to claim 1, wherein the front bottom part connecting the bed to the lower end of the front cover is gradually inclined from a central portion of the machine tool toward the side bottom parts connecting the bed to the respective lower ends of the side covers.

7. The machine tool according to claim 1, wherein curved surfaces are provided individually at portions where the front cover and each of the side covers intersect each other.

8. The machine tool according to claim 1, wherein each of the front and side bottom parts connecting the bed to the respective lower ends of the front cover and the side covers is provided with a cutting fluid supply passage through which a cutting fluid is to be supplied for machining the workpiece.

* * * * *